US008436077B2

(12) United States Patent
El-Shoubary

(10) Patent No.: US 8,436,077 B2
(45) Date of Patent: May 7, 2013

(54) LIPID-TREATED PARTICLES AND POLYMERS CONTAINING THE PARTICLES

(75) Inventor: Modasser El-Shoubary, Crofton, MD (US)

(73) Assignee: Cristal USA Inc., Hunt Valley, MD (US)

( * ) Notice: Subject to any disclaimer, the term of this patent is extended or adjusted under 35 U.S.C. 154(b) by 482 days.

(21) Appl. No.: 12/639,583

(22) Filed: Dec. 16, 2009

(65) Prior Publication Data

US 2011/0144251 A1    Jun. 16, 2011

(51) Int. Cl.
*C08K 9/00* (2006.01)
*C08K 3/22* (2006.01)

(52) U.S. Cl.
USPC ............ 523/200; 523/210; 524/497; 524/570

(58) Field of Classification Search ................... 523/200, 523/210; 524/497
See application file for complete search history.

(56) References Cited

U.S. PATENT DOCUMENTS

| 4,061,503 | A | 12/1977 | Berger et al. |
| 4,810,305 | A | 3/1989 | Braun et al. |
| 5,188,831 | A | 2/1993 | Nicoll et al. |
| 5,260,353 | A * | 11/1993 | Palmer et al. ................. 523/200 |
| 5,891,237 | A | 4/1999 | Kinniard |
| 6,620,234 | B1 | 9/2003 | Kostelnik et al. |
| 6,646,037 | B1 | 11/2003 | El-Shoubary et al. |
| 6,765,041 | B1 | 7/2004 | El-Shoubary et al. |
| 7,259,195 | B2 | 8/2007 | El-Shoubary et al. |
| 7,601,780 | B2 | 10/2009 | Bell et al. |
| 2003/0029359 | A1 | 2/2003 | Marshall et al. |
| 2005/0228112 | A1* | 10/2005 | Takahashi et al. ............ 524/497 |
| 2006/0047021 | A1* | 3/2006 | Craig et al. ................... 523/210 |
| 2006/0111473 | A1* | 5/2006 | Yuan et al. .................... 523/210 |

FOREIGN PATENT DOCUMENTS

| EP | 0535972 A1 | 4/1993 |
| EP | 0628303 A1 | 12/1994 |
| WO | WO 90-06103 | 6/1990 |
| WO | WO 93-11742 | 6/1993 |

OTHER PUBLICATIONS

"File:Triglyceride-GeneralStructure.png"; printed from Wikipedia website: http://en.wikipedia.org/wiki/File:Triglyceride-GeneralStructure.png; Oct. 28, 2009; 2 pages.
"Vegetable fats and oils"; printed from Wikipedia website: http://en.wikipedia.org/wiki/Vegetable_oil; Oct. 28, 2009; 10 pages.
"List of vegetable oils"; printed from Wikipedia website: http://en.wikipedia.org/wiki/List_of_vegetable_oils; Nov. 20, 2009; 16 pages.

* cited by examiner

*Primary Examiner* — Vickey Nerangis
(74) *Attorney, Agent, or Firm* — Dunlap Codding, P.C.; Tanzina Chowdhury

(57) ABSTRACT

A coated particulate solid composition includes a particulate inorganic solid having deposited on its surface a treatment oil comprising lipids. The particulate inorganic solid can include a base particle of titanium dioxide, zinc sulfide, zinc oxide, iron oxide, lead oxide, aluminum oxide, silicon dioxide, zirconium oxide and/or chromium oxide. The treatment oil is optionally a vegetable oil. The treatment oil containing lipids optionally contains glycerides such as triglycerides, and diglycerides, and can contain phospholipids. In one embodiment, the coated particulate solid composition includes particulate titanium dioxide, wherein the treatment oil provides increased bulk density, and enhanced dispersibility in plastic as well as improved lacing resistance.

19 Claims, No Drawings

LIPID-TREATED PARTICLES AND POLYMERS CONTAINING THE PARTICLES

CROSS REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of Invention

The invention relates generally to a coated particulate solid compositions and, more particularly, but not by way of limitation, to a particulate inorganic solid having deposited on its surface a treatment oil containing lipids, a process for surface treating a particulate inorganic solid to produce a lipid-coated particulate inorganic solid, and a process for loading such a solid in polymer compositions.

2. Background of the Invention

Particulate inorganic pigments are used as opacifiers and colorants in many industries, including the coatings, plastics, and paper industries. In particular, titanium dioxide pigments, generally in the form of finely divided powders, are added to a polymer melt for imparting whiteness and/or opacity to the finished plastic article.

In general, the effectiveness of the particulate pigment in such applications depends on how evenly the pigment can be dispersed in the polymer melt. For this reason, pigments are generally handled in the form of a finely divided powder. Titanium dioxide, the most widely used white pigment in commerce today due to its ability to confer high opacity when formulated into end-use products, is handled in the form of a finely divided powder in order to maximize the opacifying properties imparted to materials formulated therewith. However, titanium dioxide powders are inherently dusty and frequently exhibit poor powder flow characteristics during the handling of the powder itself, especially during formulation, compounding, and manufacture of end-use products. In addition, these particles typically have a hydrophilic surface, making them difficult to incorporate in hydrophobic materials such as plastics, and thus, they require long periods of time and/or high levels of energy to achieve optimum dispersal.

To this end, chemical modification of titanium dioxide particle surfaces has been a preferred approach to achieving optimum pigment opacity as well as good flow characteristics. Surface treatment agents are typically added to the particulate titanium dioxide; however, the selection of the surface treatment agent is often a compromise between effectiveness, cost, compatibility with other additives in the plastic, and performance properties in the plastic.

A variety of treatments has been studied. For example, U.S. Pat. No. 7,601,780 discloses a silanized inorganic powder treated with a long chain fatty acid and U.S. Patent Application Publication No. U.S. 2003/0029359 A1 discloses pigment particles treated with polysaturated and unsaturated fatty acid esters. U.S. Pat. No. 6,646,037 discloses treating titanium dioxide with alkyl sulfonic acid salts, and U.S. Pat. No. 6,765,041 discloses treatment with alkyl phosphate esters. Organosilicon compounds have also been used. For instance, U.S. Pat. No. 4,061,503 discloses the treatment of particulate titanium dioxide with a siloxane compound for improving the dispersibility of titanium dioxide in pigmented and/or filled paints and plastics, and in reinforced plastic composite compositions. Also, U.S. Pat. No. 4,810,305 discloses hydrophobic pigments and fillers obtained by surface treatment with polydimethylsiloxanes and with specific organopolysiloxanes.

While there has been much research regarding the coating of titanium dioxide, further improvements are needed. To date, treatment techniques remain a compromise between cost, processability and final product properties. Despite the significant research done in this area, there remains a need for economical surface treatment of particulate titanium dioxide that provides improved handling, dispersion and final product properties.

SUMMARY OF THE INVENTION

The present invention provides a coated particulate solid composition for use primarily in polymeric matrices, as well as a process for surface treating a particulate inorganic solid and for loading particulate titanium dioxide into polymer concentrate. The coated particulate solid composition of the present invention includes a particulate inorganic solid having deposited on its surface a treatment oil containing lipids. Optionally, the particulate inorganic solid includes a base particulate of titanium dioxide, zinc sulfide, zinc oxide, iron oxide, lead oxide, aluminum oxide, silicon dioxide, zirconium oxide and chromium oxide, kaolin, talc, mica or calcium carbonate. The treatment oil can comprise a vegetable oil containing the lipids, or can include glycerides such as triglycerides and diglycerides. Optionally, the treatment oil includes phospholipids.

A process for surface treating a particulate inorganic solid to produce a lipid-coated particulate solid includes providing a particulate inorganic solid and mixing the particulate inorganic solid with a treatment oil containing lipids to form a lipid-coated particulate solid. The particulate inorganic solid can include a titanium dioxide base in which case the process optionally includes a drying step. When such particulate inorganic solids having a titanium dioxide base have also undergone filtration and washing steps, the step of mixing the particulate inorganic solid with the treatment oil comprising lipids can be performed after the filtration and washing steps, but prior to a drying step. Optionally, the lipid-coated particulate solid comprising titanium dioxide is micronized and the treatment oil comprising lipids is mixed with the particulate inorganic solids before or during the micronizing step. In another embodiment, the treatment oil comprising lipids is mixed with the particulate inorganic solids after the micronizing step.

A process for loading particulate titanium dioxide into a polymer concentrate includes the following steps. A treatment oil comprising lipids is mixed with a particulate titanium dioxide to form a lipid-coated particulate titanium dioxide. The lipid-coated particulate titanium dioxide is then mixed with a polymer resin to form a polymer concentrate comprising lipid-coated particulate titanium dioxide present in an amount in the range of from about 50% to about 85% by weight of the polymer concentrate.

Thus, utilizing (1) the technology known in the art; (2) the above-referenced general description of the presently claimed and/or disclosed inventive process(es), methodology (ies), apparatus(es) and composition(s); and (3) the detailed description of the invention that follows, the advantages and novelties of the presently claimed and/or disclosed inventive process(es), methodology(ies), apparatus(es) and composition(s) would be readily apparent to one of ordinary skill in the art.

DETAILED DESCRIPTION OF THE INVENTION

Before explaining at least one embodiment of the invention in detail, it is to be understood that the invention is not limited in its application to the details of construction, experiments, exemplary data, and/or the arrangement of the components set forth in the following description. The invention is capable of other embodiments or of being practiced or carried out in various ways. Also, it is to be understood that the terminology employed herein is for the purpose of description and should not be regarded as limiting.

There is a need for new particulate pigment coating technologies having the capability of providing increased bulk density and improved dispersibility and lacing resistance in plastic, but in a cost-effective manner. As mentioned above, a variety of methods have been studied for preparing such pigments, but typically present a compromise between effectiveness, cost, compatibility with other additives in the plastic, and performance properties in the plastic. Surprisingly, it has been discovered that coating particulate inorganic solids with lipids, such as vegetable oil, can provide increased bulk density, improved dispersibility in plastic materials, and excellent performance properties such as lacing resistance in the plastic materials.

Examples of suitable base particulate for forming the coated particulate solid composition, and which are commonly used in plastic materials include, but are not limited to, titanium dioxide, zinc sulfide, zinc oxide, iron oxide, lead oxide, aluminum oxide, silicon dioxide, zirconium oxide, chromium oxide, kaolin, talc, mica and calcium carbonate.

The lipid-containing treatment oil can be present on the particulate inorganic solid over a wide range and depends in large part on the particle size. The particle size can range from about 0.001 micron to about 20 microns. When the particulate inorganic solid is considered a filler or an extender, such as kaolin, calcium carbonate, talc and mica, the particle size range is normally from about 0.5 micron to about 20 microns. For particulate inorganic solids used specifically for pigmentary purposes, the average particle size ranges from about 0.1 microns to about 0.5 microns. Generally, when the particulate inorganic solid is titanium dioxide in the pigmentary form, the average particle size is in the range of 0.15 microns to 0.35 microns. When the particulate inorganic solid is transparent titanium dioxide, the average particle size is typically from about 0.01 to 0.15 microns, while ultrafine or nanoparticle solids can have an average primary particle size in the range of from about 0.001 micron to about 0.1 micron. When the particulate inorganic solid shape is roughly spherical, these measurements represent the diameter. When the particulate inorganic solid shape is acicular or nonspherical, then these measurements represent the measurement of the longest dimension.

Overall, the lipid-containing treatment oil is present on the particulate inorganic solid in an amount in the range of from about 0.1% to about 25% by weight of the particulate inorganic solid, based on the weight of the particulate inorganic solid prior to depositing the treatment oil comprising lipids. However, when used in filler and pigmentary applications, wherein the particulate inorganic solid has a particle size in the range of from about 0.1 micron to about 20 micron, the lipid-containing treatment oil is typically present on the surface in an amount in the range of from about 0.1% to about 5% by weight of the particulate inorganic solid, based on the weight of the particulate inorganic solid prior to depositing the treatment oil comprising lipids. In some applications an ultrafine particle size is used having an average primary particle size in the range of from about 0.001 micron to 0.1 micron, and due to the higher surface area, the lipid-containing treatment oil is often present on the surface in an amount in the range of from about 10% to about 25% by weight of the particulate ultrafine inorganic solid, based on the weight of the particulate ultrafine inorganic solid prior to depositing the treatment oil comprising lipids.

In one embodiment, the particulate inorganic solid comprises a titanium dioxide base. Any form of titanium dioxide is suitable for the particle of the invention. Preferably, the titanium dioxide is in the rutile or anatase form. The titanium dioxide can be prepared by any known process, such as the sulfate process or the chloride process.

The titanium dioxide useful in the invention covers a broad average particle size ranging from about 0.001 micron to about 20 micron ($\mu m$). As described above, for use in typical pigmentary applications, the titanium dioxide typically has a particle size in the range of from about 0.15 $\mu m$ to about 0.35 $\mu m$ (hereinafter referred to as "pigmentary particle size range"). Often, pigmentary titanium dioxide has a particle size in the range of from about 0.2 $\mu m$ to about 0.35 $\mu m$. In some applications, an ultrafine particle size is used having an average primary particle size (crystallite size) in the range of from about 0.001 $\mu m$ to 0.15 $\mu m$ (hereinafter referred to as "ultrafine particle size range"). The ultrafine titanium dioxide is often a precipitated material comprised of small anatase primary crystallites, typically on the order of a few nanometers (nm) in size. These crystallites are further bonded together to form what are often referred to as primary aggregates which typically range in diameter from 0.05 micron (50 nm) to 0.1 micron (100 nm). These primary aggregates can also be further bonded together to form agglomerates that are roughly one or two microns (1-2 $\mu m$) in diameter, as measured by the D50 (median size). The final agglomerated particle can thus have an internal porous network.

Note that in the case of ultrafine particles, the term "primary particle size" refers to the crystallite size rather than the aggregate or agglomerate particle size. To avoid confusion, when referring to crystallite size hereinafter and in the appending claims, the term "crystallite size" parenthetically follows the term "average primary particle size."

The titanium dioxide may be untreated titanium dioxide obtained directly from a production process such as the chloride or sulfate processes. Alternatively, the titanium dioxide may be treated with at least one coating material prior or subsequent to treatment with the lipid-containing treatment oil of the present invention. Suitable coating materials include inorganic oxides, such as aluminum oxide, silicon dioxide, zirconium oxide, inorganic phosphates, acid-soluble titanium dioxide, mixtures thereof and the like. For example, rutile titanium dioxide ($TiO_2$) is coated with alumina ($Al_2O_3$). The amount of alumina is preferably 0.01% to 1.0% by weight in terms of $Al_2O_3$ relative to $TiO_2$. Processes to deposit metal oxides onto a titanium dioxide are well known to those skilled in the art. Preferably, the metal oxides are added by wet treatment or by gas-phase deposition. Suitable organic coating materials include, but are not limited to, siloxanes, organohalosilanes, organophosphinic compounds, organosulfonic compounds, polyalcohols such as trimethylolpropane and alkanolamines, such as triethanolamine.

The treatment oil of the present invention comprises lipids. Lipids are a group of naturally-occurring molecules which includes fats, waxes, sterols, fat-soluble vitamins (such as vitamins A, D, E and K), monoglycerides, diglycerides, triglycerides, phospholipids, and others. Glycerides, also referred to as acylglycerols, are esters formed from glycerol and fatty acids. Glycerol has three hydroxyl functional groups, which can be esterified with one, two, or three fatty acids to form monoglycerides, diglycerides, and triglycerides. Vegetable oils and fats, for example, contain mostly triglycerides, i.e. three moles of a fatty acid esterifying one mole of glycerine. The term "glyceride treatment oil" as used herein and in the appended claims, refers to a treatment oil containing one or more monoglyceride, diglyceride, triglyceride, or combinations thereof.

The glyceride treatment oils can be present on the surface of the particulate inorganic solid in an amount in the range of from about 0.1% to about 25% by weight of the particulate inorganic solid, based on the weight of the particulate inorganic solid prior to depositing the treatment oil. For particulate inorganic solids comprising titanium dioxide particles in the pigmentary particle size range, the glyceride treatment oil is typically present on the surface in an amount in the range of from about 0.1% to about 5% by weight of the particulate inorganic solid, based on the weight of the particulate inorganic solid prior to depositing the glyceride treatment oil. For particulate inorganic solids comprising titanium dioxide particles in the ultrafine particle size range, the glyceride treatment oil is typically present on the surface in an amount in the range of from about 5% to about 25% by weight of the particulate inorganic solid, based on the weight of the particulate inorganic solid prior to depositing the glyceride treatment oil.

To some extent, the characteristics of a particular glyceride treatment oil can depend on the actual fatty acids present in the individual triglyceride molecules. Linear chain fatty acids are said to be saturated, and their presence in high proportions in a triglyceride mixture is likely to make it solid. A fatty acid containing one double bond is said to be monounsaturated, the most common example being oleic acid which, like stearic acid, has 18 carbon atoms. Fatty acids with two or three double bonds are said to be polyunsaturated fatty acids and their presence typically lowers the melting point. Thus, a triglyceride mixture containing a high proportion of monounsaturated or polyunsaturated fatty acids is likely to be liquid.

The treatment oil of the present invention can also comprise phospholipids. Phospholipids are a class of lipids typically containing a diglyceride, a phosphate group, and a simple organic molecule. Phospholipids have a hydrophilic "head" containing the negatively charged phosphate or other group, and a hydrophobic "tail" usually consisting of long fatty acid hydrocarbon chains. Their physical structure allows phospholipids to be compatible with both hydrophilic and hydrophobic surfaces and materials.

When the treating oil comprises phospholipids, the phospholipid can be present on the surface of the particulate inorganic solid in an amount in the range of from about 0.1% to about 25% by weight of the particulate inorganic solid, based on the weight of the particulate inorganic solid prior to depositing the treatment oil. For particulate inorganic solids comprising titanium dioxide particles in the pigmentary particle size range, the phospholipids are typically present on the surface in an amount in the range of from about 0.1% to about 5% by weight of the particulate inorganic solid, based on the weight of the particulate inorganic solid prior to depositing the treatment oil. For particulate inorganic solids comprising titanium dioxide particles in the ultrafine particle size range, the phospholipids are typically present on the surface in an amount in the range of from about 5% to about 25% by weight of the particulate inorganic solid, based on the weight of the particulate inorganic solid prior to depositing the treatment oil.

Vegetable oils provide an excellent source of lipids for the treatment oil of the present invention. Suitable vegetable oils include edible oils, oils used for biofuel, drying oils, and other oils containing lipids and derived from plants. Examples of major edible vegetable oils suitable for the present invention include, but are not limited to, castor oil, coconut oil, corn oil, cottonseed oil, hemp oil, mustard oil, olive oil, palm oil, peanut oil, rapeseed oil (canola), rice bran oil, safflower oil, sesame oil, soybean oil, and sunflower seed oil. Other suitable edible oils include nut oils such as almond oil, cashew oil, hazelnut oil, macadamia nut oil, pecan oil, peanut oil, pine oil, and the like. Oils from melon and gourd seeds can also be used. The amount of vegetable oil deposited on the surface of the particulate inorganic solid is preferably as described above for glyceride treatment oils and treatment oils comprising phospholipids.

Oils and fats are often distinguished based on their melting point; oils are liquid at room temperature, and fats are solid. However, the term "vegetable oil," as used herein and in the appended claims, refers to any lipid-containing oil or fat obtained from plants, regardless of whether the material is solid or liquid at room temperature. Solid fats can readily be converted to liquid form, if desired, by heating or by, for example, dissolving in an appropriate solvent, therefore the distinction between oil and fat is not necessary.

The methods for adding the lipid-containing treatment oil may be similar to methods for adding other surface treatments that are flexibly and easily incorporated into production processes such as titanium dioxide production processes. Thus, there are many places during production of particulate inorganic solids in which the lipid-containing treatment oil may be added and the points of additions described herein are not meant to be exhaustive. The optimal point during which to add the lipid-containing treatment oil will, in part, depend on the process in which it is to be incorporated.

In the case of titanium dioxide particulate, and in the simplest of methods, the lipid-containing treatment oil may be added by spraying or pouring into a system in which the titanium dioxide is already present. To maximize the uniformity of the distribution of the lipid-containing treatment oil, preferably, a mixing device is used to mix or to stir the lipid-containing treatment oil and the titanium dioxide. Devices such as a V-shell blender equipped with an intensifier bar for application of a liquid to a powder or other suitable mixing devices now known, or that come to be known to those skilled in the art may be used.

One preferred mixing device is a micronizer. The lipid-containing treatment oil may be metered into a micronizer or jet pulverizer along with the titanium dioxide powder to be ground. Air or steam micronization techniques may be used at temperatures from room temperature up to 250° C. or higher.

In a conventional production process, the lipid-containing treatment oil may, by way of further example, be added to a spray dryer feed or repulped filter cake, to a high intensity milling device, to a micronizer feed prior to, or concurrent with micronization, or to the dry micronized product. If a sand mill is utilized to correct particle size, the lipid-containing oil can be added to, for example, the sand mill discharge. Upon drying, the lipid-containing oil forms a coating on the particle surfaces. In some embodiments, it is desirable to add the lipid-containing treatment oil after any filtration and washing stages, but prior to any drying stage. In such cases, it may be desirable to add the lipid-containing treatment oil to a fluidized, washed filter cake with agitation in order to assure uniform mixing of the lipid-containing treatment oil among the titanium dioxide particles.

If the lipid-containing treatment oil is added to a dry titanium dioxide such as a spray dryer product or micronizer feed or product, particular care should be taken to ensure uniform mixing of the lipid-containing treatment oil with the titanium dioxide powder. This may, for example, be accomplished by using a V-shell blender equipped with an intensifier bar or by using other suitable mixing devices. If the lipid-containing treatment oil is combined with spray dryer product or micronizer feed, the treated titanium dioxide may be fluid energy milled using steam or air to produce a treated, finished titanium dioxide. Alternatively, the lipid-containing treatment oil may be added directly to the micronized finished titanium dioxide. In some instances, it is desirable to add the lipid-containing treatment oil in stages, for example, to two or three process points.

The composition and amounts of the lipid-containing treatment oil are as described for the coated particulate solid compositions. Once the lipid-coated pigment is formed, it may then be combined with a polymer. The nature of the surface treatment of the present invention allows the treated pigments to be easily incorporated into a polymer matrix. The phrase "polymer matrix" refers to the substance comprising the polymer and the lipid-coated pigment. Polymers that may be of use in the present invention include polymers of unsubstituted ethylene monomers, including polyethylene, polypropylene, polybutylene, and copolymers of ethylene with alpha-olefins containing 4 to 12 carbon atoms or vinyl acetate; vinyl homopolymers, acrylic homopolymers and copolymers, polyamides, polycarbonates, polystyrene, acrylonitrile-butadiene-styrenes and polyethers. Other suitable polymer types include, but are not limited to, polyvinylchloride, polyurethanes, polysulfones, polyimides, polyesters and chlorinated polyesters, polyoxyethylenes, phenolics, alkyds, amino resins, epoxy resins, phenoxy resins and acetal resins.

The lipid-coated pigment may be combined with the polymer and have a loading of up to about 87% by weight, based on the weight of the polymer matrix. Depending upon the application, the composition of lipid-coated titanium dioxide and polymer can contain other additives, fillers, and pigments. Zinc sulfide, barium sulfate, calcium carbonate, zinc stearate, and combinations thereof are preferred pigments for use in the composition. The amount of lipid-coated titanium dioxide used will vary dependent upon the final application.

One convenient technique is to first prepare a concentrate of lipid-coated titanium dioxide with the organic polymer and then mix the concentrate with more organic polymers to achieve the desired weight ratio. A polymer concentrate typically has a loading of lipid-coated pigment of about 50% to about 87% by weight based on the weight of the polymer matrix and often as high as 75% to about 87% by weight based on the weight of the polymer matrix. This loading may be used as a masterbatch. A "masterbatch" is meant to refer to a mixture of two or more substances that are blended together and then blended with one or more other ingredients that may be the same as, or different from, either of the first two substances. The methods for creating a masterbatch with the lipid-coated pigment are known to those skilled in the art. For example, lipid-coated titanium dioxide pigment can be dry-blended with the organic polymer and then mixed in the melt. This can be done, for example, by using a Banbury mixer or a twin screw extruder.

It has been found, surprisingly and unexpectedly, that the treated pigments of this invention have increased bulk density and enhanced dispersibility in plastic. It was further found that the treated pigments of this invention impart greater lacing resistance to polymers into which they are incorporated.

In order to further illustrate the present invention, the following examples are given. However, it is to be understood that the examples are for illustrative purposes only and are not to be construed as limiting the scope of the invention.

Example 1

10 kg of neutral base oxidizer discharge slurry (42.5% solids) was heated at 60° C. with mixing while adding 54.7 gm of sodium aluminate solution (23.3% $Al_2O_3$). The pH of the resulting 0.3% alumina base was raised to 8.4 with 50% NaOH and the mixture was continued to mix for an additional 15 minutes while the temperature was attained at 60° C. The slurry was then filtered and washed with 4250 gm hot water. The resulting cake was re-pulped and used for surface treatment.

The above prepared cake, equivalent to 1200 gm dry pigment, was re-pulped in water forming a 35-40% solids slurry; 0.7% (8.4 gm) of MAZOLA™ corn oil was added, and the mixture was stirred for 5 minutes at room temperature. The corn oil was purchased from a retail food supplier. The slurry was then dried at 60° C. overnight, sieved through #8 mesh screen, and then micronized.

Example 2

Example 2 was prepared as in Example 1, but the cake was treated with 8.4 gm of LouAna™ canola oil. The canola oil was purchased from a retail food supplier.

Example 3

Example 3 was prepared as in Example 1, but the cake was treated with 8.4 gm of GIANT™ olive oil. The olive oil was purchased from a retail food supplier.

Example 4

Example 4 was prepared as in Example 1, but the cake was treated with 8.4 gm of WESSON™ soybean oil. The soybean oil was purchased from a retail food supplier.

Example 5

Example 5 was prepared as in Example 1, but the cake was treated with 8.4 gm of HOLLYWOOD™ safflower oil. The safflower oil was purchased from a retail food supplier.

Comparative Example

The Comparative Example was prepared as in Example 1, but the cake was treated with 0.60% by weight triethanolamine based on the weight of dry pigment.

Lacing Evaluations

The high temperature stability of polymers containing pigments is an important property of commercial polymer films, especially polyethylene film applications. Voiding or "lacing" accompanies the failure of films and may manifest as a void or hole in the plastic film. Lacing is believed to be a measure of volatility at specific weight percent pigment loadings and processing temperatures. Table 1 below, shows the % moisture determined by a Mitsubishi CA-200 MoistureMeter™ at 300° C. All pigment samples were conditioned for 24 hours at 23° C. with 50% humidity prior to testing. The sample loading was 0.25-0.3 gm. Nitrogen gas was used for sweeping.

The moisture contents for pigment coated with the above-identified triglyceride-containing vegetable oils are shown in Table 1. A moisture content below 0.35% is considered acceptable, and below 0.28% is excellent.

Lacing tests were conducted on 50% $TiO_2$ concentrate samples prepared using a Haake Record 9000 Computer Controlled Torque Rheometer. Thus, 125 g of $TiO_2$ and 125 g of low density polyethylene LDPE 722™ manufactured by Dow Chemical Company were dry-blended and added to the 75° C. preheated chamber with rotors running at 50 rpm. One minute after addition of the $TiO_2$/LDPE mixture, the chamber temperature was raised to 105° C. Frictional heat generated by the mixing process was allowed to drive the rate of incorporation of the $TiO_2$ into the LDPE until a steady state mixture was achieved. The concentrate was removed from the mixing chamber and placed into a Cumberland Crusher to obtain finely granulated 50% concentrate samples. The granulated concentrates were conditioned for 48 hours at 23° C. and 50% relative humidity. These concentrates were then let down into Dow Chemical 722™ LDPE to achieve a 20% loading of $TiO_2$ in the final film.

Lacing evaluations were run on a 1-ft extruder equipped with a cast film slot die. A temperature profile of 625° F. die, 515° F. clamp ring, 415° F. zone 3, 350° F. zone 2, and 300° F. zone 1 was used. The screw speed was set at about 90 rpm. A 25.4 cm polished chrome chill roll, set in conjunction with the extruder, was used to maintain a 75-μm-film thickness, and to cool and transport the films. The chill roll distance from the die lips was about 22 mm and the temperature was about 27° C.

After the $TiO_2$/LDPE mix was placed in the hopper, the material was allowed to purge until the appearance of a white tint in the film was first noted. To ensure the concentration of $TiO_2$ in the film had stabilized, a time interval of two minutes was allowed before lacing observations were recorded and a film sample obtained. The extruder was then purged with LDPE until the film turned clear. Lacing performance was determined by counting the relative size and number of holes generated in a film sample laid out on a dark surface. The lacing evaluation results for pigment coated with the above-identified vegetable oils are shown in Table 1. A 1.0-3.0 rating system was used. A rating of 1 was given to films with no lacing, 2 was given to films showing the onset of lacing, and 3 was given to films with extreme lacing. Increments of 0.1 were used to give an indication of the relative performance between samples.

TABLE 1

Lacing Test Results

| Sample # | ID | 300° C. % Moisture | Lacing |
|---|---|---|---|
| Example 1 | 0.7% corn oil | 0.2494 | not measured |
| Example 2 | 0.7% canola oil | 0.2532 | 1.0 |
| Example 2 | 0.8% canola oil | — | 1.0 |
| Example 3 | 0.7% olive oil | 0.2519 | not measured |
| Example 4 | 0.7% soybean oil | 0.2250 | not measured |
| Example 5 | 0.7% safflower oil | 0.2322 | not measured |
| Comparative Example | 0.6% triethanolamine | — | 1.4 |

Bulk Density

Bulk density tests were conducted using the Tapped Density Tester™ model #JV2000 by Copley Scientific. The 250 ml cylinder was filled with pigment until the 250 mark without any tapping. The highest height and the weight were recorded. The loose bulk density was determined as (weight in gm/highest height in $cm^3$). The machine is then set to tap for 5 minutes and the highest height was re-recorded. The packed bulk density is calculated as (weight in gm/highest height after tapping in $cm^3$).

Results of the bulk density tests are shown in Table 2. A packed bulk density of 0.6-0.8 is considered acceptable, while that above 0.8 is considered excellent.

TABLE 2

Bulk Density Test Results

| Sample | Description | Loose Bulk Density | | | Packed Bulk Density | |
|---|---|---|---|---|---|---|
| | | grams | $cm^3$ | $g/cm^3$ | $cm^3$ | $g/cm^3$ |
| Example 1 | 0.7% corn oil | 189 | 248 | 0.762 | 204 | 0.926 |
| Example 2 | 0.7% canola oil | 177 | 250 | 0.708 | 194 | 0.912 |
| Example 3 | 0.7% olive oil | 183 | 254 | 0.720 | 200 | 0.915 |
| Example 4 | 0.7% soybean oil | 205.4 | 254 | 0.809 | 202 | 1.017 |
| Example 5 | 0.7% safflower | 173.3 | 250 | 0.6939 | 196 | 0.884 |

Dispersion Testing

Using a small-scale laboratory extrusion apparatus, a measure of pigment dispersion into organic polymers is obtained by measuring the relative amount of pigment trapped onto screens of extruder screen packs. Tests are run using a 75% $TiO_2$ concentrate matrix with low density polyethylene, the matrix prepared using a Haake™ 3000 Rheomix mixer. The mixer is controlled and monitored with a Haake™ 9000 Rheocord Torque Rheometer. 337.7 grams of micronized $TiO_2$ and 112.6 grams of NA209 LDPE manufactured by Equistar were dry blended and added to the 75° C. mixing chamber with rotors operating at 50 rpm. The mixer temperature was programmed to increase to 120° C. one minute after the dry blend was introduced to the mixing chamber. After a steady state mixture was achieved, the compound was mixed for an additional 3 minutes. The compound was removed from the chamber and granulated using a Cumberland crusher.

Dispersion tests are conducted using a Killion single screw extruder, model KL 100 equipped with a 20:1 length to diameter screw. The extruder is preheated at 330° F. (166° C.), 350° F. (177° C.), 390° F. (199° C.), and 380° F. (193° C.) from zone 1 to the die, respectively, and operated at 70 rpm. A purge of 1000 grams of NA952 LDPE manufactured by Equistar is run through the system, and a new screen pack is installed. The screen pack consists of 40/500/200/100 mesh screens from the die towards the extruder throat. After temperature stabilization, 133.33 grams of granulated 75% $TiO_2$ concentrate sample matrix is fed into the extruder. This is followed with 1500 grams of NA952 purge as the feed hopper empties. After the LDPE purge is extruded, the screens are removed, separated and tested using a relative count technique from the measurements from an X-ray fluorescence spectrometer. The number of $TiO_2$ counts per second is obtained for the 100, 200 and 500 mesh screens in the pack and totaled to obtain the dispersion result.

The dispersion test results are shown in Table 3. Lower TiO$_2$ counts per second are desired. A count result of less than 5,000 is considered to represent good dispersion, and less than 2,000 is considered to be excellent dispersion.

TABLE 3

Dispersion Test Results (TiO$_2$ Counts/Second)

| Sample | Description | 100 | 200 | 500 | Total |
|---|---|---|---|---|---|
| Example 1 | 0.7% corn oil | 348 | 163 | 281 | 792 |
| Example 2 | 0.7% canola oil | 305 | 133 | 242 | 680 |
| Example 3 | 0.7% olive oil | 174 | 128 | 204 | 506 |
| Example 4 | 0.7% vegetable oil | 761 | 196 | 172 | 1,129 |
| Example 5 | 0.7% safflower | 534 | 201 | 216 | 951 |
| Comparative Example | 0.6% triethanolamine | — | — | — | 13,700 |

From the above examples and descriptions, it is clear that the present inventive process(es), methodology(ies), apparatus(es) and composition(s) are well adapted to carry out the objects and to attain the advantages mentioned herein, as well as those inherent in the presently provided disclosure. While presently preferred embodiments of the invention have been described for purposes of this disclosure, it will be understood that numerous changes may be made which will readily suggest themselves to those skilled in the art and which are accomplished within the spirit of the presently claimed and disclosed inventive process(es), methodology(ies), apparatus (es) and composition(s) described herein.

What is claimed is:

1. A process for loading particulate titanium dioxide into a polymer concentrate, the process comprising the steps of:
    (a) mixing a lipid-containing treatment oil with a particulate titanium dioxide to form a lipid-coated particulate titanium dioxide, wherein the lipid-containing treatment oil comprises at least one of a vegetable oil, a triglyceride, and a diglyceride; and
    (b) mixing the lipid-coated particulate titanium dioxide with a polymer resin to form a polymer concentrate, wherein the polymer resin comprises a polyolefin, and wherein the particulate titanium dioxide present in the polymer concentrate is in an amount of from about 50% to about 85% by weight of the polymer concentrate.

2. The process of claim 1, wherein the treatment oil comprises a vegetable oil.

3. The process of claim 1, wherein the treatment oil comprises at least one triglyceride.

4. The process of claim 1, wherein the treatment oil further comprises at least one phospholipid.

5. The process of claim 1, wherein the polyolefin is selected from the group consisting of polyethylene, polypropylene, and polybutylene, and combinations thereof.

6. The process of claim 1, wherein the polyolefin is polyethylene.

7. The process of claim 1, further comprising the step of filtering and washing the particulate titanium dioxide prior to the step of mixing the lipid-containing treatment oil with the particulate titanium dioxide to form the lipid-coated particulate titanium dioxide.

8. The process of claim 7, further comprising the step of drying the lipid-coated particulate titanium dioxide.

9. The process of claim 1, further comprising the step of: micronizing the particulate titanium dioxide.

10. The process of claim 9, wherein the step of mixing the lipid-containing treatment oil with the particulate titanium dioxide to form the lipid-coated particulate titanium dioxide occurs during the step of micronizing the particulate titanium dioxide.

11. The process of claim 9, wherein the step of mixing the lipid-containing treatment oil with the particulate titanium dioxide occurs prior to the step of micronizing the particulate titanium dioxide.

12. The process of claim 9, wherein the step of mixing the lipid-containing treatment oil with the particulate titanium dioxide occurs after the step of micronizing the particulate titanium dioxide, and prior to the step of mixing the lipid-coated particulate titanium dioxide with a polymer resin to form a polymer concentrate.

13. The process of claim 1, wherein the lipid-containing treatment oil is combined with the particulate titanium dioxide pigment in an amount of from about 0.1% to about 5% by weight of the particulate titanium dioxide pigment, based on the weight of the particulate titanium dioxide pigment prior to depositing the lipid-containing treatment oil.

14. The process of claim 1, wherein the lipid-containing treatment oil is combined with the particulate titanium dioxide in an amount of from about 5% to about 25% by weight of the particulate titanium dioxide pigment, based on the weight of the particulate titanium dioxide pigment prior to depositing the lipid-containing treatment oil.

15. A polymer concentrate comprising particulate titanium dioxide particles coated with a lipid-containing treatment oil and dispersed in a polyolefin polymer matrix, the lipid coated particulate titanium dioxide present in the polymer concentrate in an amount of about 50% to about 87% based on the weight of the polymer matrix, wherein the lipid-containing treatment oil comprises at least one of a vegetable oil, a triglyceride, and a diglyceride.

16. The polymer concentrate of claim 15, wherein the particulate titanium dioxide particles are coated with a vegetable oil.

17. The polymer concentrate of claim 15, wherein the particulate titanium dioxide particles are at least partially coated with a triglyceride.

18. The polymer concentrate of claim 15, wherein the particulate titanium dioxide particles are at least partially coated with a diglyceride.

19. The polymer concentrate of claim 15, wherein the lipid-containing treatment oil further comprises at least one phospholipid.

* * * * *

UNITED STATES PATENT AND TRADEMARK OFFICE
CERTIFICATE OF CORRECTION

PATENT NO. : 8,436,077 B2  
APPLICATION NO. : 12/639583  
DATED : May 7, 2013  
INVENTOR(S) : Modasser El-Shoubary Page 1 of 1

It is certified that error appears in the above-identified patent and that said Letters Patent is hereby corrected as shown below:

In the Claims:

Column 12, line 38: After "matrix, the" delete "lipid"

Signed and Sealed this  
Twenty-third Day of July, 2013

Teresa Stanek Rea  
*Acting Director of the United States Patent and Trademark Office*